United States Patent [19]

Hatta et al.

[11] Patent Number: 4,528,638
[45] Date of Patent: Jul. 9, 1985

[54] SHOPPING CALCULATOR WITH COMPARISON FEATURE

[75] Inventors: Koichi Hatta, Yamatokoriyama; Kenichiro Komeda, Gose, both of Japan

[73] Assignee: Sharp Kabushiki Kaisha, Osaka, Japan

[21] Appl. No.: 416,278

[22] Filed: Sep. 9, 1982

[30] Foreign Application Priority Data

Sep. 17, 1981 [JP] Japan .............................. 56-147101
Sep. 30, 1981 [JP] Japan .............................. 56-157157

[51] Int. Cl.³ ............................................. G06F 15/20
[52] U.S. Cl. .................... 364/709; 364/715; 364/464
[58] Field of Search .............. 364/709, 710, 715, 464, 364/705

[56] References Cited

U.S. PATENT DOCUMENTS 4,168,533  9/1979  Schwartz ........................... 364/705
4,192,006  3/1980  Hausdorff .......................... 364/715
4,280,180  7/1981  Eckert et al. ....................... 364/464
4,334,278  6/1982  Marmon ............................. 364/709
4,409,666 10/1983  Nishiguchi ......................... 364/710
4,446,528  5/1984  Marmon ............................. 364/709

Primary Examiner—David H. Malzahn
Attorney, Agent, or Firm—Birch, Stewart, Kolasch & Birch

[57] ABSTRACT

The present invention discloses a shopping calculator into the budget memory of which, when shopping, a previously decided budget value is entered for storage by means of a budget key, and each time a purchase is made the cost of the purchase is entered into budget memory by means of DATA ENTRY keys and subtracted from the value in the budget memory, and when the remainder is below a preset value or when the budget value is exceeded, a warning is be given.

In addition, another embodiment of the present invitation discloses a shopping calculator having a multiple symbol display unit, a means for carrying out comparative shopping calculations by which the prices and weights of at least two Commodities may be compared to determine which of the two is the better bargain, and a means by which the input values for the abovementioned comparative shopping calculations may be displayed, in order, in the abovementioned symbol display units.

8 Claims, 21 Drawing Figures

FIG. 8 (F)          BEST

SHOPPING CALCULATOR WITH COMPARISON FEATURE

BACKGROUND OF THE INVENTION

The present invention relates to a shopping calculator into which a budgeted value may be entered, and expenditures, in turn, subtracted, so that when the remainder is less than a preset amount a warning is given.

OBJECTS AND SUMMARY OF THE INVENTION

The object of the present invention is to provide a shopping calculator by use of which a shopper, having decided the amount of money which may be spent, enters this amount in advance into the memory of the calculator, and while shopping enters the amount of each expenditure in turn into the calculator, so that each entry is automatically subtracted from the budgeted amount, and because, when the balance becomes less than a preset amount or when the budget is exceeded, a warning is given, shopping may proceed efficiently without exceeding the budget.

Furthermore, another object of the present invention is to provide a shopping calculator by which the prices and weights of at least two Commodities which are to be compared to determine which is the better bargin (hereinafter referred to as the comparative structure factor), can be displayed by means of multiple symbols which are provided, and when the prices and quantities of these two Commodities are entered in turn into the shopping calculator, the above mentioned symbols are in turn displayed (for example, by means of illuminating a light, or causing a light to flash, or extinguishing a light), and by indicating the input process conditions and by indicating to the user how far the input has proceeded in the present operation, comparative shopping calculations are made exceedingly easy.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

One embodiment in accordance with the present invention consists of a shopping calculator comprised of DATA ENTRY keys, a BUDGET key by which the budgeted amount is entered into memory, an AMOUNT key by which the contents of the budget memory are decreased by the amount of cost entered, and an warning which is activated when the remainder in the budget memory is less than a preset amount.

Furthermore, this embodiment in accordance with the present invention is a shopping calculator provided with such an above-mentioned BUDGET key which also has the capability of causing the display of the present budget amount, as well as the above-mentioned AMOUNT key which also has the capability of causing the display of the remainder.

Furthemore, another embodiment in accordance with the present invention is a shopping calculator which is equipped with a device capable of comparative shopping calculations, and is provided with multiple symbols in order to display the composite structural factor of the prices and quantities, etc., of at least two Commodities which are to be compared to see which is the better bargain.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 5(A) to FIG. 5(D) are diagrams indicating examples of the displays.

FIG. 8(A) to FIG. 8(I) are diagrams showing display examples based on the operation of the display unit keys of another embodiment of the present invention.

DETAILED DESCRIPTION OF THE PRESENT INVENTION

The following is a detailed explanation of the present invention with reference to the diagram.

Figure 1:
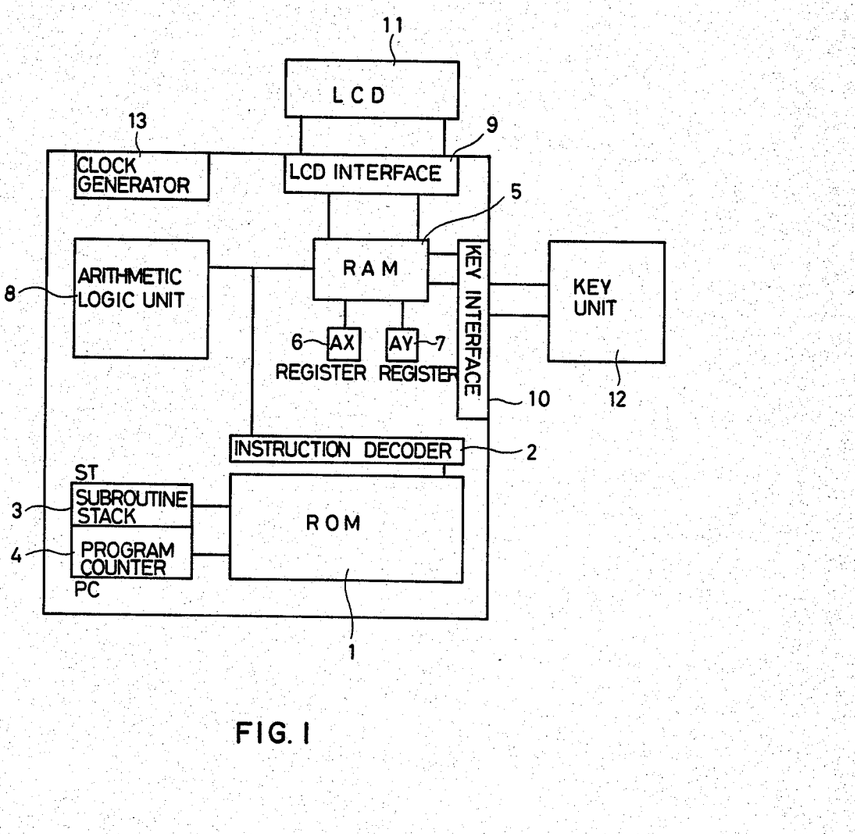
FIG. 1 is the block circuit diagram of the internal mechanism of the present invention.

FIG. 1 is the block circuit diagram of the internal mechanism of the present invention. In the drawing, a READ ONLY MEMORY (ROM) 1, an INSTRUCTION DECODER 2, a SUBROUTINE STACK 3, and a PROGRAM COUNTER 4, make up the control unit, and a RAMDOM ACCESS MEMORY (RAM) 5, an AX-REGISTER 6, and an AY-REGISTER 7 make up the memory unit.

An ARITHMETIC LOGIC UNIT (ALU) 8, through the medium of an INTERFACE UNIT 9, and a KEY INTERFACE UNIT 10, is connected to an LDC DISPLAY UNIT 11 and a KEY UNIT 12. A CLOCK GENERATOR 13 is a built-in power supply and clock circuit.

The AX-REGISTER 6 and the AY-REGISTER 7 are directly connected to the abovementioned RAM 5, and serve to specify the file number and column in the RAM 5, by acting as a data pointer. Also, the abovementioned ROM 1 contains the control program of the shopping calculator which executes all instructions from the INSTRUCTION DECODER 2.

The abovementioned SUBROUTINE STACK 3 supplies the necessary subroutines at the time of program execution, and the PROGRAM COUNTER 4 is the program address counter.

Figure 2:
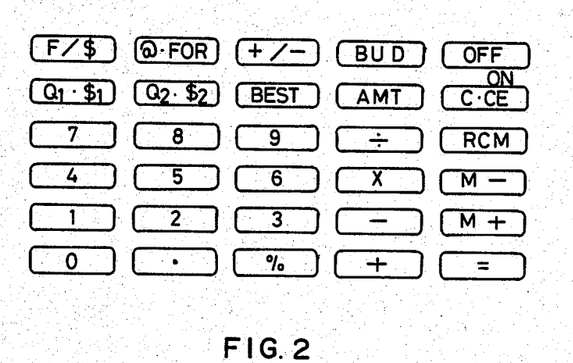
FIG. 2 is the key arrangement diagram.

The KEY UNIT 12, as shown in FIG. 2, consists of DATA ENTRY keys 0 to 9 and each type of FUNCTION key. The BUDGET key |BUD| stores the input from the entry keys in the budget memory, and at the same time serves to display the existing budget value. The AMOUNT key |AMT| has the function of subtracting the numerical values, entered as expenditures by means of the DATA ENTRY keys, from the contents of the budget memory, and at the same time has the function of causing the remainder to be displayed.

The MODE key |F/$| selects the dollar mode, in which mode the display unit displays the dollar ($) sign, and also multiplies the input integral numbers of by 1/100 and causes the decimal point to be displayed. The positions before the decimal point indicate dollars, and the last two columns after the decimal point indicate cents.

The CORRECTION key |+/−| serves to invert the displayed value, that is to say, the entered value, changing its sign from positive to negative or vice versa.

Figure 3:
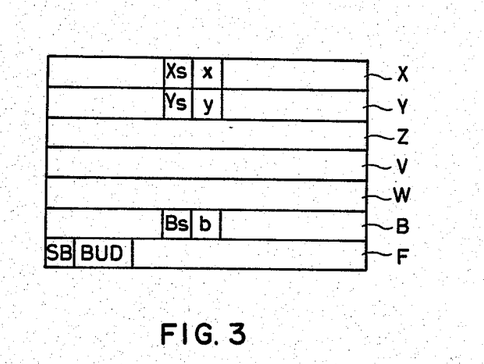
FIG. 3 is the configuration diagram of the RANDOM ACCESS MEMORY (RAM) of a preferred embodiment of the present invention.

FIG. 3 is the configuration diagram of the abovementioned RAM 5, which is used for temporary storage of results when calculations are made, for data storage, and for setting flags and is made up of a total of 7 registers—X,Y,Z,V,W,B and F. The addresses of these registers are specified in the previously mentioned AX-REGISTER 6, and the columns are specified in the AY-REGISTER. The ARITHMETIC LOGIC UNIT 8 performs the four basic arithmetic functions according to the program stored in the ROM 1.

The configuration of the electronic mechanism of the present invention is as outlined above. Following is a detailed explanation of its action, with reference to FIG. 4 and FIG. 5(A) to FIG. 5(D).

Figures 5, 5A, 5D:
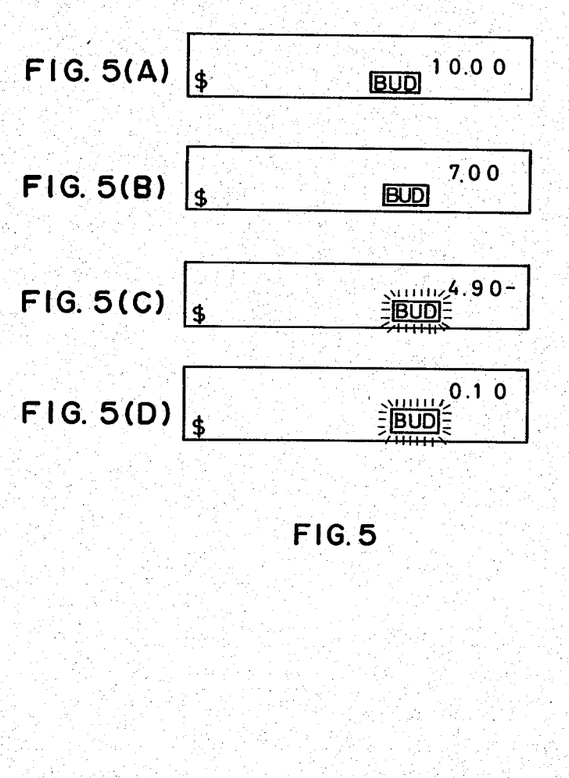
Figure 6:
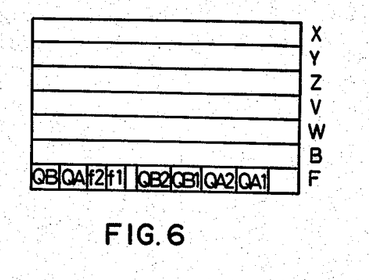
FIG. 6 is a configuration diagram of another embodiment of the present invention.

First, the |F/$| is operated, thus specifying the dollar ($) mode. Next, using the entry keys , the budget value (for example |1| |0| |0| |0|) is entered, and when the BUDGET key |BUD| is pressed, the calculation 1000×1/100 is carried out, the converted value (10.00 dollars) is stored in the B register of the RAM 5, which is reserved fo the budget memory, and at the same time, as indicated in FIG. 5(A), the budget value is displayed in the LCD DISPLAY UNIT 11.

Figure 4:
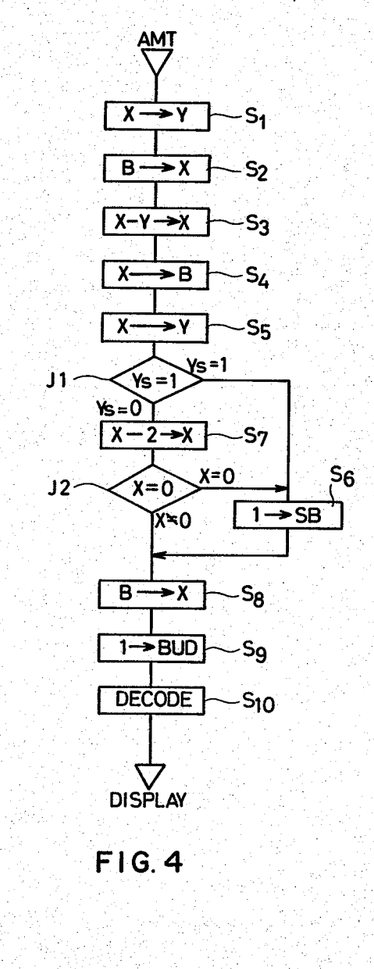
FIG. 4 is a flowchart of operation.

After the budget value has been entered into the budget memory, when the amount spent for a purchased article (for example, 300) is entered, that value (3.00 dollars) is read into the X-REGISTER of RAM 5. After this, the amount key |AMT| is operated, causing the expenditure amount (3.00 dollars) in the X-REGISTER to be transferred to the Y-REGISTER (Step $S_1$), and at the same time the budget value (10.00 dollars) or else the remainder stored in the B-REGISTER is transferred and stored in the X-REGISTER (Step $S_2$). Then, as shown in Step $S_3$, the amount of the expenditure in the Y-REGISTER is subtracted from the budget value or the remainder in the X-REGISTEr, and the new remainder (7.00 dollars) is transferred from the X-REGISTER to the B-REGISTER (Step $S_4$).

As shown in Step $S_5$, the new remainder in the X-REGISTER is transferred to the Y-REGISTER, and according to the decision operation $J_1$ the flag $Y_5$ of the Y-REGISTER is set to "1" or "0". At this point, the new remainder (7.00 dollars) is positive, and, because it is larger than the preset value (for example, 2.00 dollars), the process proceeds to Step $S_8$ through Step $S_7$ and the decision operation $J_2$, and the remainder in the B-REGISTER is transferred to the X-REGISTER. Then in Step $S_9$ the flashing light signal flag BUD is set, and after that, through Step $S_{10}$, as shown in FIG. 5(B), the remainder "7.00" and the |BUD| mark are displayed at the LCD DISPLAY UNIT 11.

On the other hand, if, for example, an expenditure of $14.90 is made against a budget of $10.00, the remainder is a negative quantity, and, in the above-mentioned decision operation $J_1$, the flag $Y_5$ is set to 1, and in Step $S_6$ the flashing light signal flag SB is set, and the same subsequent Steps $S_8$ to $S_{10}$ take place, and a display occurs. In this case, as shown in FIG. 5(C), the value by which the budget value is exceeded ($4.90) is indicated with a minus sign and displayed. At the same time, the |BUD| mark flashes, reporting the overage.

Furthermore, in the case where the remainder is positive, in Step $S_1$ and decision operation $J_1$ a decision is made as to the relative magnitude of the remainder and the preset value (for example, $2.00), and when this remainder becomes, for example, 10 cents, which is smaller than the above mentioned preset value, proceeding from Step $S_6$, the Steps $S_8$, $S_9$, and $S_{10}$ are carried out in order, and, as shown in FIG. 5(D), a light is flashed to warn that the budget is close to being exceeded. Furthermore, this warning may also take place in audible form.

In this way, at the point when the budget is close to being exceeded, and when the budget has already been exceeded, the remainder or the overage value is displayed, and, together with this display, the |BUD| mark can be displayed by means of a flashing light, providing a warning signal.

Further, it is acceptable to enter the number of articles and their unit price as a method of entering the expenditure value. Also, if a value is entered and subtracted from the remainder by mistake, the error can be corrected by reentering the same value and operating the |+/−| key.

In the above mentioned embodiment of the present invention the case was presented where dollars were displayed, but yen values can also be handled in exactly the same way as outlined.

Figure 7:
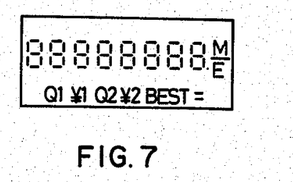
FIG. 7 is a diagram showing one example of the display unit of another embodiment of the present invention.

Following is a detailed explanation of one embodiment of the present invention, with reference to FIG. 2 and FIG. 7, which show the key layout and the display unit, respectively.

Following is a example of the calculations in which two Commodities are compared to determine which is the better bargain.

An explanation of the key operation and display examples is given below.

(Example)
Commodity 1 . . . . . . . . 150 g for 720 yen
Commodity 2 . . . . . . . . 170 g for 750 yen
(Key operation)
In FIG. 2, the keys which must be used when engaged in comparison shopping are, the (0) to (9), and (·) keys as DATA ENTRY keys, and the ($Q_1$), ($\$_1$), ($Q_2$), and ($\$_2$) keys in order to enter costs and quantities or weights, along with the (BEST) key to carry out the comparison.

| | |
|---|---|
| $Q_1$ | enters the weight of Commodity 1 |
| $Q_2$ | enters the weight of Commodity 2 |
| $\$_1$ | enters the cost of Commodity 1 |
| $\$_2$ | enters the cost of Commodity 2 |

| BEST | is used to make the decision as to which Commodity is the better buy. |

Furthermore, in order to determine which is the better bargain, the costs per unit weight (or number) of Commodity 1 and Commodity 2 are compared, and displayed.

More specifically, the calculation:

$$(\$_1)/(Q_1) - (\$_2)/(Q_2) = \emptyset$$

is carried out, and
where $\emptyset > 0$, Commodity 2 is the best buy,
where $\emptyset = 0$, both Commodities are of equal value and
where $\emptyset < 0$, Commodity 1 is the best buy.
(Display examples)

In FIG. 7, the liquid crystal display unit (LCD), which makes up the display mechanism, is shown, having 8 columns of display segments. In the case where the price, quantity, and (BEST) keys are operated the Commodity which is the better value can be displayed. In FIG. 7, the symbols $Q_1$, $_1$, $Q_2$, and $_2$, show how far the input has proceeded, and the "BEST" and "=" symbols show whether Commodity 1 and Commodity 2 are of equal value, or which one is the bargain. As discussed previously, in this example in the case where the weight of Commodity 1 (150 g) is $Q_1$, and its price (720 yen) is $_1$, the weight of Commodity 2 (170 g) is $Q_2$ and its price (750 g) is $_2$, then based on the key operation the symbols $Q_1$, $_1$, $Q_2$, $_2$ will be displayed in order.

Figure 8A:
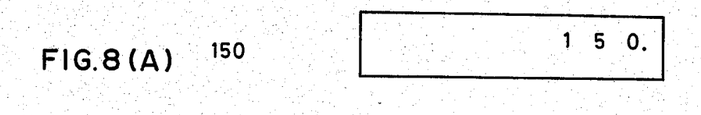
Figures 8B, 8C:
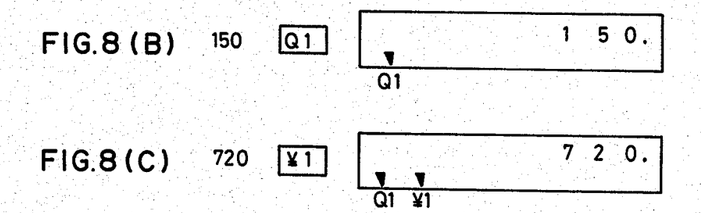

FIG. 8(B) shows the condition where the weight $Q_1$ is entered, and in this case the $Q_1$ symbol is illuminated.

Figure 8D:
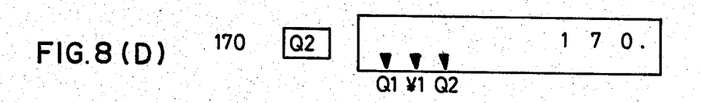

FIG. 8(C) shows the condition where the cost $_1$ is entered, and in this case the $_1$ symbol is illuminated. FIG. 8(D) shows the condition where the weight $Q_2$ is entered, and in the case the $Q_2$ symbol is illuminated.

Figure 8E:
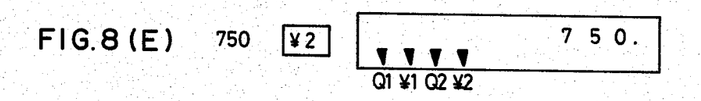

FIG. 8(E) shows the condition where the cost $_2$ is entered, and in this case the $_2$ symbol is illuminated.

Figure 8F:
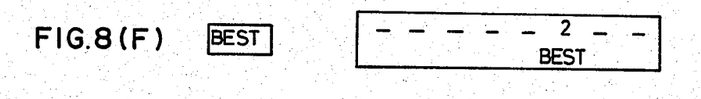

FIG. 8(F) shows the condition where the calculator determines and displays which of Commodity 1 or Commodity 2 is the better buy. That is:

$$_1/Q_1 - _2/Q_2 = 720/150 - 750/170 = 0.44 > 0$$

showing that Commodity 2 is the best buy.

Figure 8G:
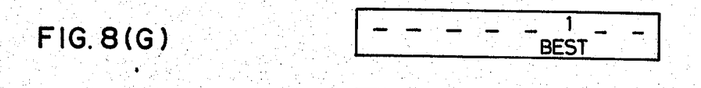
Figure 8H:
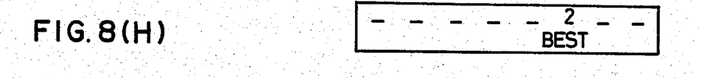
Figure 8I:
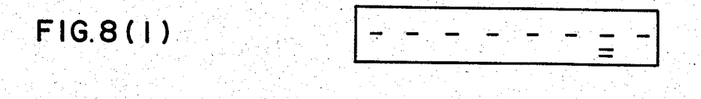

Furthermore, FIG. 8(G) to FIG. 8(I) indicate the case where the costs per unit weight for Commodities 1 and 2 are calculated and compared, and, based on the results, the display shows which of the two is the better way, or else shows that they are equal in value.

The system block diagram for this embodiment of the present invention is identical to the system block diagram for the previously discussed embodiment of the present invention, and is indicated in FIG. 1.

In the discussion below, the system performance of the present invention is explained with reference to the flowcharts depicted in FIG. 9 and FIG. 10.

Figure 9:
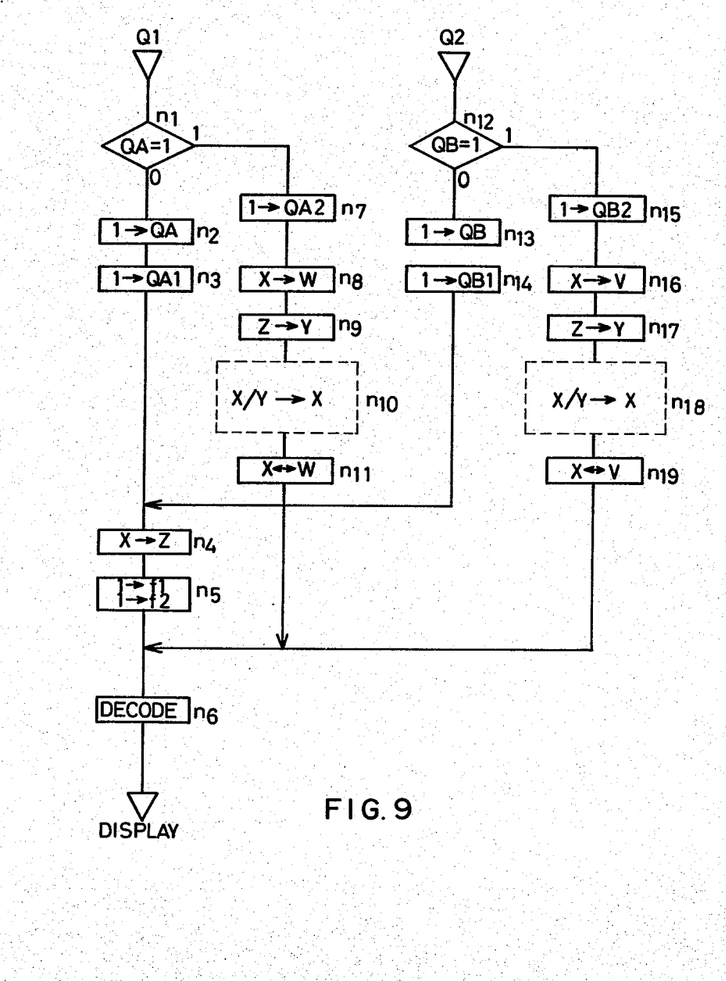
FIG. 9 and FIG. 10 are flow charts accompanying the explanations of the action of the respective embodiments of the present invention.

FIG. 9 is the key input and symbol display flowchart.

First, in the case of the calculation to determine which of Commodity 1 (150 g/720 yen) or Commodity 2 (170 g/750 yen) is the better bargain, the DATA ENTRY keys, and the ($Q_1$) or ($_1$) keys are used, and when these keys are operated according to the conditions outlined in FIG. 8(A) to FIG. 8(C), first, in Step $n_1$ a decision operation is carried out to determine whether or not flag QA had been set, indicating whether or not values for $Q_1$ and $_1$ had been previously entered. With the first key operation QA is reset (QA=0), then the QA flag is set ($1 \to QA$) ($n_2$), and flag $QA_1$ is set ($1 \to QA_1$) ($n_3$) in order that the symbol $Q_1$ be illuminated.

After, this the contents of the X-REGISTER are transferred to the MEMORY REGISTER Z ($X \to Z$) ($n_4$). Next, from the operation of $Q_1$ and $_1$, division should take place, and the arithmetical function flags $f_1$ and $f_2$ are set ($1 \to f_1$, $1 \to f_2$) ($n_5$). According to $f_1$ and $f_2$ the following calculation schedule is set up.

| $f_1$ | $f_2$ | Type of Calculation |
|---|---|---|
| 0 | 0 | Addition |
| 0 | 1 | Subtraction |
| 1 | 0 | Multiplication |
| 1 | 1 | Division |

Furthermore, the contents of the X-REGISTER are decoded to conform with the display pattern of the LCD DISPLAY UNIT, through the medium of the DECODER ($n_6$).

The display conditions at this time are as shown in FIG. 8(B).

After the next value is entered by means of the data entry keys, on operating the $Q_1$ or $_1$ key the decision operation for the flag QA is carried out ($n_1$). At that point, because the QA flag is set, the symbol $_1$ should be illuminated, and flag $QA_2$ is set ($1 \to QA_2$) ($n_7$).

After that, the contents of the X-REGISTER, in wich the input cost value is being stored, are transferred to the W-REGISTER for temporary storage ($X \to W$) ($n_8$). Next, the contents of the Z-REGISTER, in which the input weight value is stored, are transferred to the Y-REGISTER ($Z \to Y$) ($n_9$). At this point, the cost value is stored in the X-REGISTER, and the weight value in the Y-REGISTER, and from the calculation $X/Y \to X$, carried out in the ARITHMETIC LOGIC UNIT ($n_{10}$), the cost per unit of weight for Commodity 1 is obtained. The cost value obtained from the ALU is exchanged with the contents of the W-REGISTER, in which a monetary value is stored, ($n_{11}$), and through the medium of the DECODER this value and the $_1$ symbol are illuminated in the display unit (see FIG. 8(C)).

When the above sequence is completed, the conditions for Commodity 1 have been established, and, next, the same calculations are carried out for Commodity 2. At this point, the weight is entered by the DATA ENTRY keys, and when the ($Q_2$) key is operated, first, a decision operation is effectuated to determine whether or not the ($Q_2$) key or the ($_2$) key has previously been operated and a value stored in memory, and whether flag QB has been set or not. At the first key operation flag QB is reset (QB=0), and from this QB is set ($1 \to QB$) ($n_{13}$), which illuminates the symbol $Q_2$ and sets flag $QB_1$ ($1 \to QB_1$)($n_{14}$). After this the contents of the X-REGISTER are transferred to the MEMORY REGISTER Z ($X \to Z$) ($n_4$). Next, from the operation of $Q_2$ and $_2$, division should take place, and the arithmetical function flags $f_1$ and $f_2$ are set ($n_5$). The contents of the X-REGISTER, in the same way as was explained for Commodity 1, are decoded to conform with the display pattern of the LCD DISPLAY UNIT, through the medium of the DECODER ($n_{16}$), and are displayed in the display element (see FIG. 8(D)).

After the next value is entered by means of the DATA ENTRY keys, on operation of the $Q_2$ or 2 key first the decision operation for the flag QB is carried out ($n_{12}$). At that point, because the QB flag is set, the symbol 2 should be illuminated, and flag $QB_2$ is set ($1 \rightarrow QB_2$) ($n_{15}$). After that, the contents of the X-REGISTER, in which the input cost value is being stored, are transferred to the V-REGISTER for temporary storage ($X \rightarrow V$) ($n_{16}$). Next, the contents of the Z-REGISTER, in which the input weight value is stored, are transferred to the Y-REGISTER ($Z \rightarrow Y$) ($n_{17}$). In the same way as for Commodity 1, the cost value is stored in the X-REGISTER, and the weight value in the Y-REGISTER, and from the calculation $X/Y \rightarrow X$, carried out in the ARITHMETIC LOGIC UNIT ($n_{18}$), the cost per unit of weight for Commodity 2 can be obtained. The cost value obtained from the ALU is exchanged with the contents of the V-REGISTER, in which a monetary value is stored, ($X \rightarrow V$) ($n_{19}$), and through the medium of the DECODER this value and the 2 symbol are illuminated in the display unit (see FIG. 8(D)). As explained above, the cost per unit of weight for Commodity 1, ($_1/Q_1$), is stored in the W-REGISTER, and the cost per unit of weight for Commodity 2, ($_2/Q_2$), is stored in the V-REGISTER.

Figure 10:
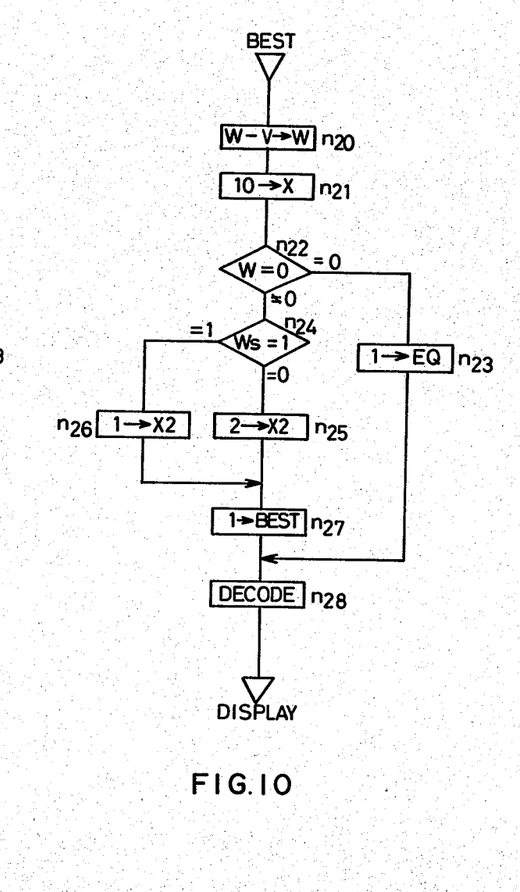

FIG. 10 is a flowchart which accompanies the following explanation, based on the above values, of how, through the operation of the (BEST) key, the costs per unit of weight for Commodity 1 and Commodity 2 are compared in order to make the decision as to which of the two Commodities is the better value, or whether they are of equal value.

As shown in FIG. 10, when the (BEST) key is operated, the W-V$\rightarrow$W sequence takes palce ($n_{20}$), and the difference between the costs per unit of weight for Commodities 1 and 2 is calculated. Next, in order to display the individual results of the shopping value comparison, code 10 is entered into segments $X_o$ to $X_7$ of the X-REGISTER to show the symbols ($n_{21}$). Next, the result of the W-V$\rightarrow$W operation undergoes a decision operation to determine whether the contents of the W-REGISTER are "0" or not ($n_{22}$). In the case of a "0" value, in order to illuminate the "=" symbol (see FIG. 2), flag EQ is set ($1 \rightarrow EQ$) ($n_{23}$), and the symbol is displayed through the medium of the decoder. In the case where the value is not "0", the result of W-V$\rightarrow$W undergoes a decision operation of determine whether it is negative or positive ($n_{24}$). In the case of a positive result, Commodity 2 is determined to be the better value, and in order to cause this fact to be displayed, "2" is entered into the 3rd column of the X-REGISTER ($2 \rightarrow X_2$) ($n_{25}$). In the case of a negative result, Commodity 1 is determined to be the better value, and in order to cause this fact to be displayed, "1" is entered into the 3rd column/bit of the X-REGISTER ($1 \rightarrow X_2$) ($n_{26}$). In addition to this, the (BEST) symbol is also illuminated in the case of either a positive or a negative result by setting the BEST flag, after which the symbol is displayed through the medium of the decoder ($n_{28}$).

In the above embodiment of the present invention, two Commodities were compared, and if at least two Commodities are compared effective results are obtained, and any symbol shape and any mode of display conditions can used in actuality, and, of course, all types of electronic calculating machines can be utilized in practice.

The invention being thus described, it will be obvious that the same may be varied in many ways. Such variation are not to be regarded as a departure from the spirit and scope of the invention, and all such modifications are intended to be included within the scope of the following claims.

What is claimed is:

1. A shopping calculator for computing the accumulated total price of selected products to be purchased and comparing said accumulated total price to a predetermined budget value comprising:
   (a) memory means for storing data;
   (b) data entry key means including,
      (1) budget key means for entering said budget value into said memory means, and
      (2) amount key means for entering the product prices of selected ones of a plurality of different products into said memory means;
   (c) arithmetic logic means for computing said accumulated total price of product prices input by said amount keys and the difference between said accumulated total product price and said budget value;
   (d) warning means for generating a warning signal when said difference is less than a preset value; and
   (e) display means for simultaneously displaying said budget value and said difference.

2. The shopping calculator of claim 1, wherein said display means displays symbols to indicate whether said difference represents an amount above or below budget value.

3. The shopping calculator of claim 2, further comprising:
   means for performing comparative shopping calculations on at least two selectable like products based on the respective prices and quantities thereof and generating a best value signal;
   a
   wherein said display means includes means for displaying which of said products is the best value in response to said best value signal.

4. The shopping calculator of claim 1, further comprising:
   means for performing comparative shopping calculations on at least two selectable like products based on the respective prices and quantities thereof and generating a best value signal;
   and
   wherein said display means includes means for displaying which of said products is the best value in response to said best value signal.

5. A method for shopping for a plurality of different product for a total accumulated product price within a predeterined budget value comprising the steps of:
   (a) providing a shopping calculator for computing the accumulated total price of selected products an comparing said accumulated total price to a predetermined budget value comprising,
   memory means for storing data;
   data entry key means including,
      budget key means for entering said budget value into said memory means, and
      amount key means for entering the product prices of selected ones of a plurality of different products into said memory means;

arithmetic logic means for computing said accumulated total price of product prices input by said amount keys and the difference between said accumulated total product price and said budget value; warning means for generating a warning signal when said difference is less than a present value; and display means for simultaneously displaying said budget value and said difference;

(b) actuating said budget key means to input said budget value into said memory means;

(c) selecting, one-at-a-time, a product from a plurality of different products, (d) actuating said amount key means for each of the products so selected to input product prices thereof into said memory means; and (e) viewing said display means to observe said budget value and said difference from time to time and and at least in response to said warning signal.

6. The method of claim 5, wherein said display means displays symbols to indicate whether said difference represents an amount above or below said budget value.

7. The method of claim 6, wherein said shopping calculator further comprises:

means for performing comparative shopping calculations on at least two selectable like products based on the respective prices and quantities thereof and generating a best value signal; and wherein said display means includes means for displaying which of said products is the best value in response to said best value signal.

8. The method of claim 5, wherein said shopping calculator further comprises:

means for performing comparative shopping calculations on at least two selectable like products based on the respective prices and quantities thereof and generating a best value signal; and wherein said display means includes means for displaying which of said products is the best value in response to said best value signal.

* * * * *